United States Patent
Schroll et al.

(10) Patent No.: US 12,329,066 B2
(45) Date of Patent: *Jun. 17, 2025

(54) ROBOTIC HARVESTING SYSTEM WITH A GANTRY SYSTEM

(71) Applicant: Oishii Farm Corporation, Jersey City, NJ (US)

(72) Inventors: Gregory Schroll, Denver, CO (US); Timothy Brackbill, Lakewood, CO (US); Eric Adamson, Denver, CO (US)

(73) Assignee: Oishii Farm Corporation, Jersey City, NJ (US)

( * ) Notice: Subject to any disclaimer, the term of this patent is extended or adjusted under 35 U.S.C. 154(b) by 891 days.

This patent is subject to a terminal disclaimer.

(21) Appl. No.: 17/522,632

(22) Filed: Nov. 9, 2021

(65) Prior Publication Data

US 2022/0248604 A1    Aug. 11, 2022

Related U.S. Application Data

(63) Continuation of application No. 17/168,512, filed on Feb. 5, 2021, now Pat. No. 11,202,409.

(51) Int. Cl.
*A01D 46/24* (2006.01)
*A01D 46/30* (2006.01)
(Continued)

(52) U.S. Cl.
CPC ............. *A01D 46/30* (2013.01); *A01D 46/24* (2013.01); *B25J 5/007* (2013.01); *B25J 9/0009* (2013.01);
(Continued)

(58) Field of Classification Search
CPC . B25J 9/026; B25J 9/0009; B25J 5/007; B25J 17/02; B25J 9/1679; B25J 9/1697; A01D 46/24; A01D 46/30
See application file for complete search history.

(56) References Cited

U.S. PATENT DOCUMENTS 3,337,071 A * 8/1967 Clark .................... E02F 9/123
56/328.1
3,401,514 A * 9/1968 Clark .................... A01D 46/24
56/328.1
(Continued)

FOREIGN PATENT DOCUMENTS

CN    109041808    12/2018
DE    3608636    9/1987
(Continued)

OTHER PUBLICATIONS

MetoMotion (Date: Apr. 7, 2020), https://www.youtube.com/watch?v=oxF3Ok6Uf64.*
(Continued)

*Primary Examiner* — Adam J Behrens
(74) *Attorney, Agent, or Firm* — Amster, Rothstein & Ebenstein LLP

(57) ABSTRACT

A robotic harvesting system includes a base, a gantry system, a robotic arm, and a control system. The base is configured to move in a direction of travel. The gantry system is coupled to the base. The gantry includes a linear transport that is configured to move along the base in substantially a same direction or opposite direction as the direction of travel. The linear transport is coupled to a rod that extends downwards from a top portion of the gantry system. A robotic arm is mounted to the rod at a first joint. A control system is configured to send one or more corresponding commands that cause the linear transport, the rod, and/or the robotic arm to move.

20 Claims, 6 Drawing Sheets

(51) Int. Cl.
    *B25J 5/00*           (2006.01)
    *B25J 9/00*           (2006.01)
    *B25J 9/02*           (2006.01)
    *B25J 9/16*           (2006.01)
    *B25J 17/00*         (2006.01)
    *B25J 17/02*         (2006.01)

(52) U.S. Cl.
    CPC ............ *B25J 9/026* (2013.01); *B25J 9/1679* (2013.01); *B25J 9/1697* (2013.01); *B25J 17/00* (2013.01); *B25J 17/02* (2013.01)

(56) References Cited

U.S. PATENT DOCUMENTS

| | | | | |
|---|---|---|---|---|
| 4,532,757 | A * | 8/1985 | Tutle | A01D 46/24 |
| | | | | 382/110 |
| 4,663,925 | A * | 5/1987 | Terada | B25J 5/007 |
| | | | | 414/730 |
| 8,666,552 | B2 * | 3/2014 | Zeelen | A01D 46/30 |
| | | | | 901/47 |
| 10,779,472 | B2 * | 9/2020 | Robertson | G06F 18/24323 |
| 2005/0126144 | A1 * | 6/2005 | Koselka | A01D 46/30 |
| | | | | 56/10.2 R |
| 2013/0226340 | A1 * | 8/2013 | Buchstab | B25J 5/04 |
| | | | | 700/245 |
| 2017/0108098 | A1 * | 4/2017 | Abdallah | B25J 9/0048 |
| 2018/0207810 | A1 * | 7/2018 | Konagai | F16H 21/46 |
| 2019/0029178 | A1 * | 1/2019 | Russel | A01D 46/30 |
| 2019/0166764 | A1 * | 6/2019 | Pitzer | A01D 46/30 |
| 2020/0323140 | A1 * | 10/2020 | Gielis | A01D 46/24 |

FOREIGN PATENT DOCUMENTS

| | | | | |
|---|---|---|---|---|
| JP | | 2004180554 | 7/2004 | |
| JP | | 2017087404 | 5/2017 | |
| JP | | 2020195336 | 12/2020 | |
| WO | WO 2009030108 | * | 3/2009 | ............ A01D 46/30 |
| WO | WO-2009030108 A1 | * | 3/2009 | ............ A01D 46/30 |
| WO | WO-2009128712 A1 | * | 10/2009 | ............ A01D 46/30 |
| WO | WO-2017152224 A1 | * | 9/2017 | ............ A01D 46/30 |
| WO | WO-2019158610 A1 | * | 8/2019 | .......... A01D 46/247 |
| WO | | 2019209167 | 10/2019 | |
| WO | WO-2019209167 A1 | * | 10/2019 | |
| WO | | 2020076616 | 4/2020 | |

OTHER PUBLICATIONS

Di Gironimo et al. "A virtual reality approach for usability assessment: case study on a wheelchair-mounted robot manipulator." Engineering with Computers, vol. 29, No. 3 (Jul. 1, 2013): pp. 359-373.

Judith Evans, "UK farmers turn to robots to plug labour shortages", Financial Times—UK agriculture, Dec. 19, 2020 access at https://www.ft.com/content/1a079b7c-b641-4288-ab9b-56b3de2be433#.

Tortuga Agtech, "Website Video 2", YouTube video, Jan. 9, 2020, accessed at https://www.youtube.com/watch?v=ZY-iAUyTyHY.

Xiong et al. "An autonomous strawberry-harvesting robot: Design, development, integration, and field evaluation." Journal of Field Robotics, vol. 37, No. 2 (Aug. 7, 2020): pp. 202-224.

* cited by examiner

ROBOTIC HARVESTING SYSTEM WITH A GANTRY SYSTEM

CROSS REFERENCE TO OTHER APPLICATIONS

This application is a continuation of U.S. patent application Ser. No. 17/168,512 entitled ROBOTIC HARVESTING SYSTEM WITH A GANTRY SYSTEM filed Feb. 5, 2021 which is incorporated herein by reference for all purposes.

BACKGROUND OF THE INVENTION

The process of harvesting objects (e.g., fruits, flowers, vegetables, etc.) from a plurality of plants is a time-consuming process. Humans are often deployed to harvest the objects, but may become tired as they are harvesting the objects. As a result, the efficiency at which humans are able to harvest the objects decreases over time. It would be useful to deploy a robotic system to harvest the objects.

BRIEF DESCRIPTION OF THE DRAWINGS

Various embodiments of the invention are disclosed in the following detailed description and the accompanying drawings.

DETAILED DESCRIPTION

Figure 1:
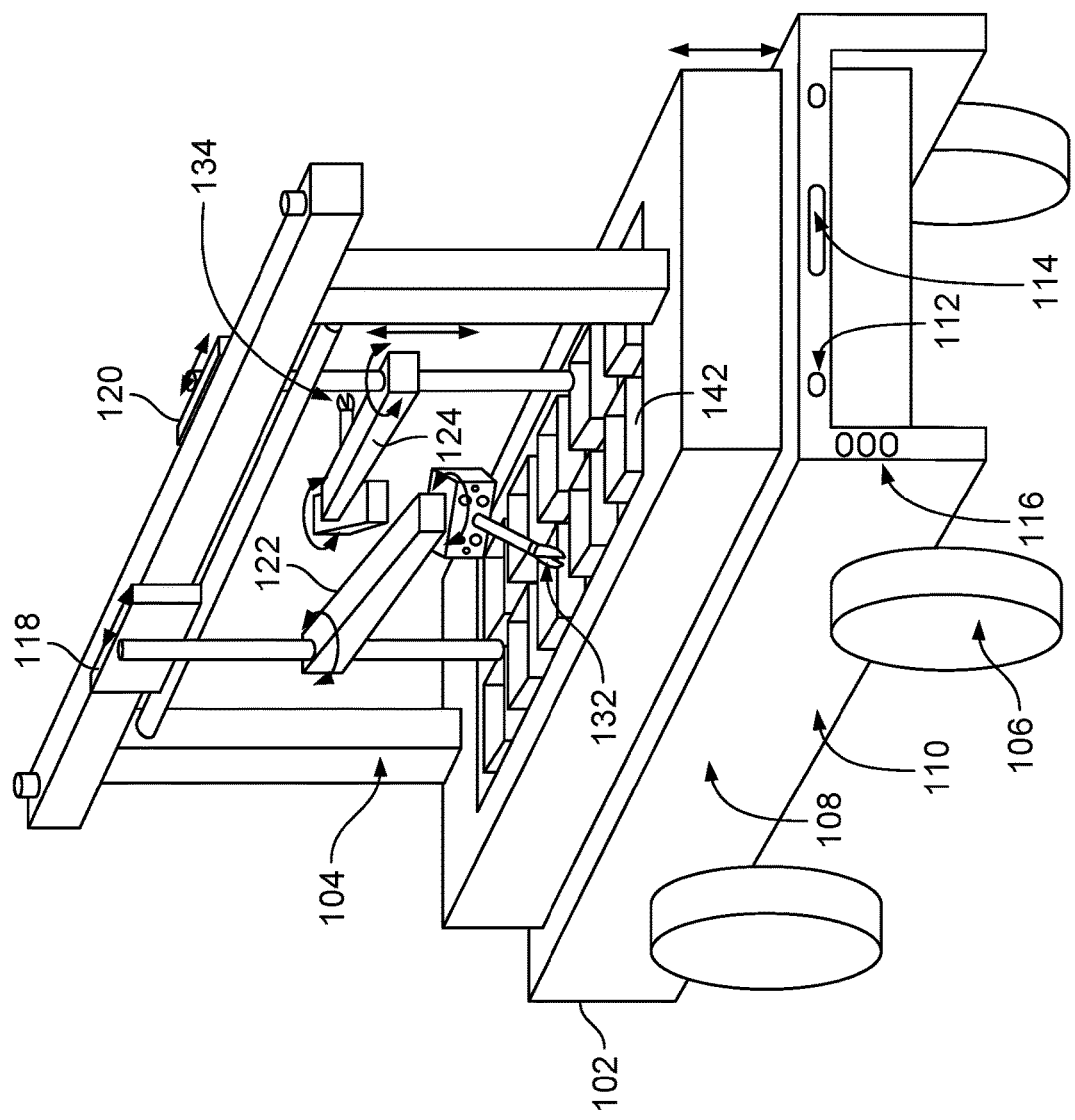
FIG. 1 is a diagram illustrating an embodiment of a robotic harvesting system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic harvesting system is disclosed herein. The robotic harvesting system includes at least a base, one or more linear transports, one or more robotic arms, and one or more end effectors. The base includes a plurality of wheels or tracks that enable the robotic harvesting system to travel (autonomously or by remote control) through a grow environment. The robotic harvesting system may be positioned at a first location to harvest a first set objects (e.g., fruit, flowers, etc.). The robotic harvesting system includes one or more cameras and/or other sensors to determine a corresponding position for a plurality of objects included in the first set at the first location.

A linear transport is mounted to the base and is configured to move along the base in substantially the same direction or opposite direction as the direction of travel of the robotic harvesting system. The linear transport is coupled to an elongated member. A robotic arm is coupled to the elongated member via a first joint. The elongated member is configured to move up and down along a vertical direction of the robotic harvesting system. The robotic arm is configured to move up and down along a vertical direction of the elongated member. The robotic harvesting system includes a control system. The control system is coupled to the linear transport, the elongated member, and the robotic arm. The control system may send one or more commands that cause the linear transport to move along the base, one or more commands that cause the elongated member to move up and down along the vertical direction of the robotic harvesting system, and/or one or more commands that cause the robotic arm to move up and down along the vertical direction of the elongated member. As a result, the robotic arm is capable of being moved to pick objects that are within reach at the particular location.

The robotic arm is comprised of at least a first segment and a second segment. The first segment of the robotic arm is coupled to the elongated member via the first joint. The first segment of the robotic arm is capable of being rotated around the first joint in a clockwise or counter-clockwise direction. The second segment of the robotic arm is coupled to the first segment of the robotic arm via a second joint. The second segment of the robotic arm is capable of being rotated around the second joint in a clockwise or counter-clockwise direction. As a result, the robotic arm is capable of approaching an object to be harvested from any angle (e.g., 360°) or nearly any angle (e.g., 356°) depending upon the grow environment in which the object to be harvested resides (e.g., whether there are any obstructions).

Other robotic harvesting systems may have robotic arms that are limited by kinematics or mechanical design to approach an object to be harvested from a single angle, for example, at a 90° angle. There may be one or more obstructions in a pick path for the object to be harvested. The one or more obstructions may include vines, branches, mechanical structure growing the plant, other objects to be harvested, etc. These other systems may be unable to maneuver the robotic arm in a manner that prevents the robotic arm from contacting the one or more obstructions. The contact may cause one or more other objects to be harvested to become damaged. The contact may also set an obstruction, such as a vine, into motion, which may make it more difficult to harvest objects at the particular location because the moving obstruction may interfere with harvesting one or more other objects. In contrast, the robotic arm disclosed herein provides the minimum amount of degrees of freedom to approach an object to be harvested from any angle (e.g., 360°) or nearly any angle (e.g., 356°) depending upon the grow environment in which the object to be harvested resides. This enables the robotic harvesting system to select a clear pick path for an object to be harvested that prevents the robotic arm from contacting one or more obstructions.

An end effector is coupled to a distal end of the robotic arm. The second segment of the robotic arm may include one or more cameras and/or one or more other sensors (e.g., depth sensor, SONAR, RADAR, LIDAR, IMU, GNSS, etc.) that are pointed in a direction of the end effector. A processing system of the robotic arm may receive one or more images from the one or more cameras and/or the one or more other sensors. The processing system may identify one or more objects from the one or more images and assign a cost associated with the one or more identified objects. The processing system may select to harvest one of the one or more identified objects based on the associated cost and determine a relative distance between a current location of the end effector and a current location of the object. The processing system may send to a control system of the robotic harvesting system a command to move the robotic arm the relative distance. In response to receiving the command, the control system may cause the linear transport, the elongated member, and/or the robotic arm to move such that the robotic arm is repositioned by the determined relative distance.

The end effector may be comprised of a cutting mechanism and a gripping mechanism, which include corresponding sets of jaws. The end effector may be configured to open and close, in parallel, the cutting mechanism and the gripping mechanism. When the cutting mechanism and gripping mechanism are open, an appendage of the plant coupled to the object may be placed in an opening associated with the corresponding sets of jaws. An actuator associated with the end effector may apply a force that causes the cutting mechanism and the gripping mechanism to close. The applied force may cause the cutting mechanism to perform a cut, such as a bypass cut, that splits the plant appendage into a first portion and a second portion while the applied force causes the gripping mechanism to grasp the second portion of the plant appendage that is coupled to the object to be harvested. The robotic harvesting system may move the end effector to a storage location and open the end effector, which causes the harvested object to be placed at the storage location.

After the robotic harvesting system has harvested a first set of objects at the first location of a grow environment, the robotic harvesting system may move to a second location of the grow environment to harvest a second set of objects. The robotic harvesting system may be configured to move a predetermined distance (e.g., 1 m) after the first set of objects has been harvested. In some embodiments, the predetermined distance is the length of the robotic harvesting system. In some embodiments, the predetermined distance is based on a density of objects to be harvested. In some embodiments, the predetermined distance is a fraction of the length of the base (e.g., 8/10) to create some overlap of the reachable zone at each location.

Each time the robotic harvesting system is moved to a new location, the one or more cameras and/or the one or more other sensors of the robotic harvesting system may obtain additional images to enable the processing system to determine corresponding positions of one or more objects to be harvested at the new location. This introduces additional delays and processing costs in the overall time to harvest objects. The configuration of the robotic harvesting system disclosed herein is optimized to harvest as many objects as possible at a particular location without having to move the robotic harvesting system. In some embodiments, images of objects to be harvested at the new location are obtained at a current location of the robotic harvesting system. Images obtained from a depth camera may be used to determine corresponding positions of the objects to be harvested at the new location. This enables the robotic harvesting system to harvest the objects at the new location without having to obtain additional images when the robotic harvesting system is at the new location.

The robotic harvesting system may repeat the process of harvesting a plurality of objects and moving to a subsequent location until the robotic harvesting system is unable to harvest any more objects because a storage capacity for the harvested objects has been reached. The robotic harvesting system is configured to wait until an operator or another robotic system removes the harvested objects from the robotic harvesting system. Subsequently, the robotic harvesting system may resume the harvesting process. When the robotic harvesting system reaches the end of a row in a grow environment, the robotic harvesting system moves to the next row in the grow environment to resume the harvesting process. When the robotic harvesting system reaches the end of a last row, the robotic harvesting system has completed a round of harvesting objects and waits for further instruction to start another round of harvesting objects.

FIG. 1 is a diagram illustrating an embodiment of a robotic harvesting system in accordance with some embodiments. In the example shown, robotic harvesting system 100 includes a base 102, a gantry system 104, robotic arms 122, 124, and end effectors 132, 134.

The components of the robotic harvesting system may be manufactured using low cost manufactured techniques, such as manufacturing techniques that are used to manufacture sheet metal. When assembled, the overall weight of these components is approximately 4-5 kg. This enables the robotic harvesting system to quickly move to different locations and the robotic arms to quickly move to different positions at a particular location. In contrast, other systems may use off-the-shelf components that include complex castings that are post-machined. These components may weigh significantly more. For example, the overall weight of the components of other robotic harvesting systems may be around 40 kg. As a result, the speed at which these other robotic harvesting systems may be able to harvest objects may be slower than robotic harvesting system 100.

A grow area may be comprised of a plurality of rows. A width of the base 102 may be designed to accommodate a width of the plurality of rows. For example, a width of a row may be 1 m. The width of a row may vary based on a location (e.g., different countries, different farms) or type of object being grown. For example, the width of a row in Europe (e.g., UK) may be different than the width of a row in the United States. In some embodiments, the width of base 102 may be between 0.5 m to 1.5 m. This may enable robotic harvesting machine 100 to maneuver between the rows without contacting a row on either side of the harvesting machine 100. A length of the base 102 may be selected such that robotic harvesting system 100 harvests a particular amount of objects (e.g., 10-15 pieces of fruit) at a particular location when robotic harvesting system 100 is in a parked state. For example, the length of base 102 may be between 1 m and 3 m. The length of base 102 may be shorter than 1 m, but this may require moving robotic harvesting system 100 more often to harvest the same amount of objects when compared to a harvesting system with a base of 1 m-3 m. This may also increase the amount of time needed to harvest the same amount of objects when compared to the harvesting system with the base of 1 m-3 m because each time the harvesting system is moved and parked, robotic harvesting system 100 may need to reorient itself with respect to the grow system to determine where objects are available for harvesting. This additional computation time increases the amount of time needed to harvest the objects. The length of base 102 may be longer than 3 m, but such a length may cause robotic harvesting system 100 to become too cumbersome and/or difficult to steer.

Some grow areas, such as glasshouses, may have existing infrastructure between the rows. For example, a glasshouse may have rails in between the rows. A shape of base 102 may be designed to enable robotic harvesting system 100 to move between the rows without contacting the existing infrastructure. For example, as seen in FIG. 1, the shape of base 102 may include a U-channel portion. This may enable robotic harvesting system 100 to be used in different types of grow environments without having to manufacture a harvesting system tailored to the specific dimensions of a grow environment.

The base 102 is coupled to a plurality of rotational components 106. The plurality of rotational components 106 may be wheels, rail wheels, treads, rollers, tracks, or any other rotational component that enables robotic harvesting system 100 to move in different directions, such as forward, backwards, left, right, and/or any combination thereof.

Base 102 may include some or all of a control system 108. Control system 108 may be comprised of one or more processors. In some embodiments, the one or more processors are graphics processing units. The one or more processors may send one or more commands that cause the plurality of rotational components 106 to move. For example, the one or more commands may cause robotic harvesting system 100 to move in a forward direction, a backwards direction, a left direction, a right direction, and/or any combination thereof. In some embodiments, the one or more commands cause robotic harvesting system 100 to move a predetermined distance (e.g., 1 m).

Control system 108 is coupled to a power supply (e.g., one or more batteries). The power supply is configured to provide power to the different components of robotic harvesting system 100. Robotic harvesting system 100 may include a charging port that enables the power supply to be recharged. In some embodiments, the charging port enables the power supply to be recharged via a power cord that is plugged into an outlet, charging station, or mobile charging device. In some embodiments, the charging port enables the power supply to be wirelessly charged.

Control system 108 may include one or more circuit boards. In some embodiments, control system 108 includes a main processing circuit board and one or more secondary processing circuit boards. The main processing circuit board that includes one or more processors may be located in base 102 and the one or more secondary processing circuit boards that include one or more processors may be located in corresponding portions of the robotic arms 122, 124 and/or the gantry system 104. The main processing circuit board may be configured to compute more complex computations, such as computer vision, while the one or more secondary processing circuit boards may be configured to compute less complex computations, such as movement control. In some embodiments, the main processing circuit board and the one or more secondary processing circuit boards are combined into a single circuit board.

Control system 108 is coupled to drive module 110. Drive module 110 may include a self-navigation system that uses an output from sensor system 114. Sensor system 114 may be comprised of one or more cameras and/or the one or more other sensors and utilize computer vision algorithms for maneuvering and obstacle avoidance. The one or more cameras may be RGB cameras, RGBD cameras, RGB/IR "time of flight" cameras, high-end high-resolution cameras utilizing multi-spectrum imaging, or a combination thereof. In some embodiments, sensor system 114 is configured to capture images at regular intervals (e.g., every second, every minute, every hour, etc.). Sensor system 114 may obtain information, such as depth information via structured infrared light, time-of-flight, stereo, LIDAR integration, structure from motion or other means, color, and/or infrared data. Sensor system 114 may include one or more other sensors, such as radar, ultrasonic, LIDAR (Light Detection And Ranging), IMU (Inertial Measurement Unit), GNSS (Global Navigation Satellite System), etc.

Robotic harvesting system 100 may include headlights 112 that enable robotic harvesting system 100 to be used in low light conditions. Robotic harvesting system 100 may include status lights 116 that indicate a current status of robotic harvesting system 100. For example, the status lights 116 may indicate that robotic harvesting system 100 is parked, moving, and/or in the process of harvesting objects. The color of status lights 116 may change depending upon the current status of robotic harvesting system 100.

Robotic harvesting system 100 may include gantry system 104. Gantry system 104 may be comprised of two vertical support beams, a crossbeam, and a base frame. In some embodiments, the two vertical support beams and the cross beam of gantry system 104 are thinner than a width of base 102. This enables robotic harvesting system 100 to travel next to row where objects to be harvested are overhanging in a row without accidentally contacting the objects to be harvested. Gantry system 104 may include a movement assembly (not shown) that is comprised of a motor and belt system, which enables the base frame of gantry system 104 to move up or down along a vertical axis of robotic harvesting system 100. The objects to be harvested by robotic harvesting system 100 may be located at different heights. For example, grapes that are hanging from vines may be located at a first height and cherries that are hanging from branches may be located at a second height. The movement assembly enables robotic harvesting system 100 to adjust the reach of robotic arms 122, 124. For example, robotic harvesting system 100 may be capable of harvesting objects from a range of heights, such as 1 foot off the ground to 10 feet off the ground. In some embodiment, gantry system 104 includes a plurality of in-line central axes with single or multiple fixed crossbeams.

Robotic harvesting system 100 includes a linear transport 118. In some embodiments, a cross beam of the gantry system 104 includes a linear rail to which linear transport 118 is coupled. The linear rail may be coupled to a second movement assembly (not shown) that is comprised of a motor and a belt system. The second movement assembly may be capable of moving linear transport 118 in substantially the same direction or opposite direction as the direction of travel of base 102. Robotic harvesting system 100 may include a second linear transport 120. The second linear transport 120 may function in a manner similar to linear transport 118.

Linear transport 118 may include an elongated member. In some embodiments, the elongated member is a rod. In some embodiments, linear transport 118 includes movement assembly that causes the elongated member to move up and down in a vertical direction of robotic harvesting system 100. The movement assembly may include a lead screw, a belt, and a servo motor. Robotic arm 122 may be mounted to the elongated member. The robotic arm 122 may be moved up or down depending on the height of objects to be harvested and/or an angle at which the objects are to be harvested.

Robotic arm 122 includes a distal end and a proximal end. Robotic arm 122 may include one or more segments. In the example shown, robotic arm 122 includes two segments. A first segment of robotic arm 122 may be coupled to the elongated member via a first joint. A second segment of robotic arm 122 may be coupled to the first segment of robotic arm 122 via a second joint. In some embodiments, the first segment of robotic arm 122 moves up and down in a vertical direction of the elongated member. The proximal end of robotic arm 122 may be rotated in a clockwise or counter-clockwise direction, such that the first segment is capable of being rotated toward and away from base 102. The distal end of robotic arm 122 may be rotated in a clockwise or counter-clockwise direction, such that the second segment is capable of being rotated toward and away from base 102. The configuration of robotic arm 122 enables robotic harvesting system 100 to approach and pick an object from any angle or any nearly angle (e.g., 356°) depending upon the grow environment in which the object to be harvested resides (e.g., whether there are any obstructions). Control system 108 may determine an approach angle for a particular object and provide one or more commands to a control board that causes robotic arm 122 to approach and pick the object from the determined approach angle. The determined approach angle may provide a clear path for robotic arm to approach and pick an object to be harvested. Approaching and picking an object at the determined approach angle may prevent robotic arm 122 from accidentally contacting an obstruction (e.g., vines, branches, other objects to be harvested) when attempting to harvest an object. Such contact could set the obstruction into motion, which may make it more difficult to harvest objects because the obstruction may (partially, completely, temporarily, permanently) obstruct the clear path to the object to be harvested. Approaching and picking an object at the determined approach angle may also prevent robotic arm 122 from potentially damaging other objects to be harvested when attempting to harvest an object.

Robotic harvesting system 100 may include a second robotic arm 124. The second robotic arm 124 may function in a manner similar to robotic arm 122. In some embodiments, robotic arm 122 and robotic arm 124 are picking objects on opposite sides of base 102. In some embodiments, robotic arm 122 or robotic arm 124 is rotated such that robotic arms 122, 124 are picking objects on the same side of base 102.

End effector 132 is mounted to a distal end of robotic arm 122. End effector 132 may be comprised of a cutting mechanism and a gripping mechanism. The cutting mechanism and the gripping mechanism include corresponding sets of jaws. End effector 132 is configured to open and close, in parallel, the cutting mechanism and the gripping mechanism. A plant may include an appendage (e.g., stem, vine, branch, stalk, etc.) and an object to be harvested (e.g., flower, piece of fruit, vegetable, etc.) When the cutting mechanism and gripping mechanism are open, an appendage of the plant may be placed in an opening associated with the corresponding sets of jaws. An actuator associated with end effector 132 may apply a force that causes the cutting mechanism and the gripping mechanism to close. The applied force may cause the cutting mechanism to perform a cut that splits the plant appendage into a first portion and a second portion while the applied force causes the gripping mechanism to grasp the second portion of the plant appendage that is coupled to the object to be harvested. As a result, end effector 132 is able to remove the harvested object from the plant without damaging the harvested object. The harvested object may be placed in a bin, such as bin 142.

Robotic harvesting system 100 may include a second end effector 134. The second end effector 134 may function in a manner similar to end effector 132.

Figure 2:
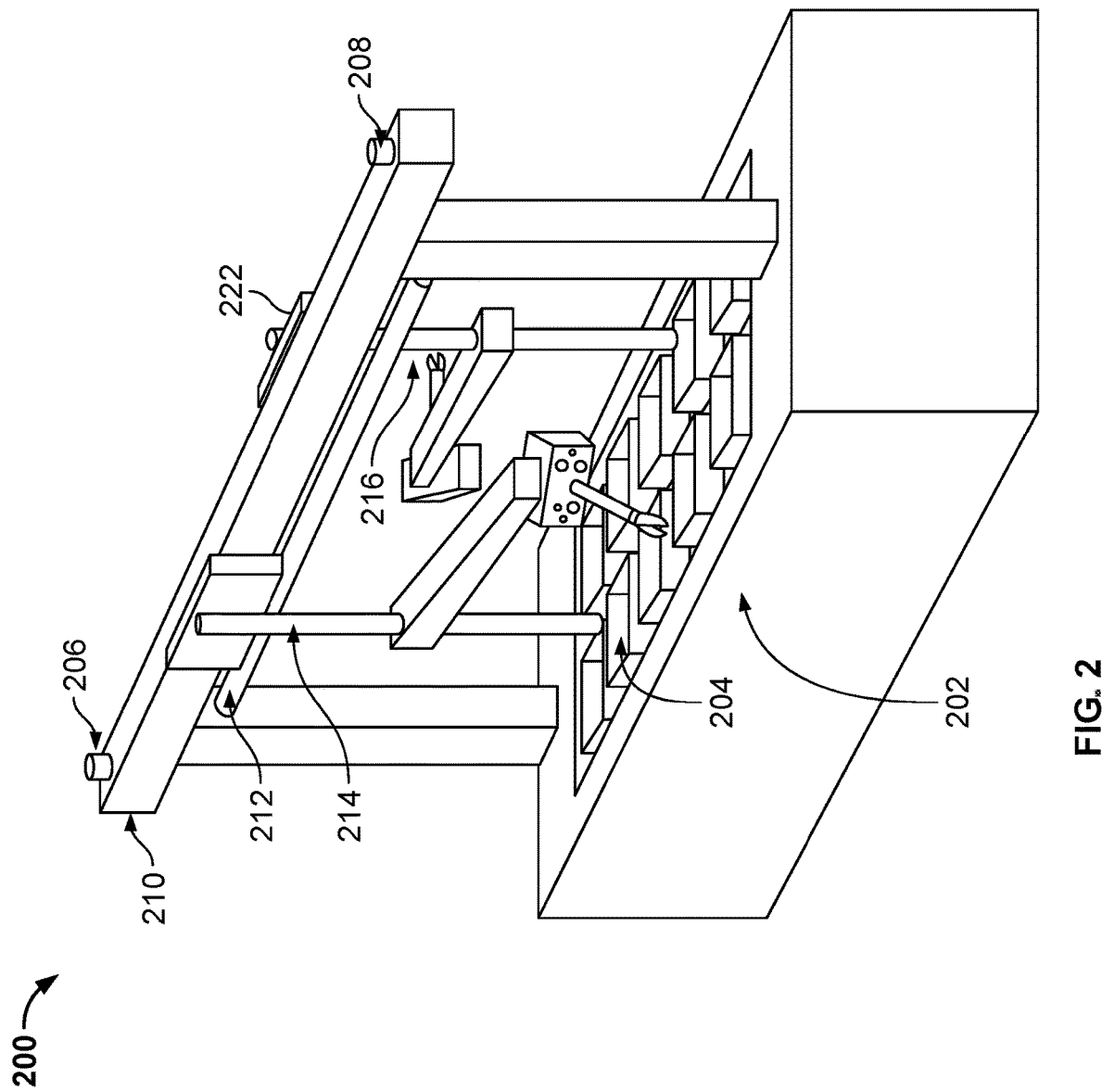
FIG. 2 is a diagram illustrating a gantry system in accordance with some embodiments.

FIG. 2 is a diagram illustrating a gantry system in accordance with some embodiments. In the example shown, gantry system 200 includes base frame 202. A top portion of the base frame 202 may include storage portion 204. Storage portion 204 may be capable of housing one or more trays that support plurality of bins (e.g., box, punnets, etc.). A harvested object may be placed into one of the bins by a robotic arm. In some embodiments, a tray is capable of supporting 8 or 10 bins. In some embodiments, storage portion 204 is capable of housing two trays.

Gantry system 200 may include communications device 206. Communications device 206 may enable the harvesting system to wirelessly communicate over a local area network, a wide area network, intranet, the Internet, and/or a combination thereof. Communications device 206 may enable a control system, such as control system 108, to receive software downloads and/or updates. In some embodiments, communications device 206 transmits picking information to a remote server (e.g., cloud-based database). The picking information may include logged information regarding a picking event, such as a timestamp, success/failure status, location, fruit size, quality, estimated weight, unique identifier, approach angle, and/or other information associated with the picking event. The remote server may store current and past plant structure and morphology information (e.g., leaf count, plant architecture).

The remote server may include a database. The database may include a graphical user interface, which can display queried information or sets of information regarding historical performance, yield, inventory, forecasted inventory, plant and fruit status, and/or plant and fruit health. The database may include a frontend API that can feed structured information back to customer systems, or receive and incorporate information from external customer systems.

The remote server may store and execute AI algorithms that identify patterns and correlations between growing conditions, yield, plant health, disease, pests, and other items. The remote server may forecast berry growth based on descriptive historical growth data captured by the harvesting system, temperature, insolation, and/or other environmental and operational inputs from the customer or from the sensing system. The remote server may forecast and issue detection software that delivers critical growing information to a user.

Gantry system 200 may include sensing device 208. Sensing device 208 may be comprised of one or more sensors. The one or more sensors may capture ambient grow information, such as light insolation, ambient temperature, relative humidity, etc. The one or more sensors may include a quantum meter that measures insolation. Sensing device 208 may include a processing board that is capable of utilizing algorithms that calculate heating and cooling degree days in real-time and connect to a remote system via a control system and store the calculated information in a remote system, such as a cloud-based data architecture.

Gantry system 200 may include linear rail 210 on which linear transport 212 is capable of moving in a same direction or an opposite direction of travel. Linear rail 210 may include a movement assembly comprised of a carriage, a belt, and a motor. Other movement assemblies may be used, such as rack and pinion, screw, etc. Gantry system 200 may include a second linear rail on which linear transport 222 is capable of moving in a same direction or an opposite direction of travel. The second linear rail may include a movement assembly comprised of a carriage, a belt, and a motor.

In some embodiments, a top portion of base frame 202 includes a first linear rail to which linear transport 212 is coupled and a second linear rail to which linear transport 222 is coupled. The linear rails are located on opposite sides of the top portion of base frame 202 (e.g., on opposite sides of storage portion 204).

Gantry system 200 may include a first elongated member 214 and a second elongated member 216. In some embodiments, the first and second elongated members 214, 216 are rods. Linear transports 212, 222 includes corresponding movement assemblies that cause elongated members 214, 216 to move up and down in a vertical direction of the robotic harvesting system 100. The movement assembly may include a lead screw, a belt, and a servo motor.

Gantry system 200 may include an ultraviolet C light (UVC) sterilization system that is comprised of an arrangement of UVC lamps. The UVC lamps may be used for illuminating a timed dose of UVC radiation on fruits, plants, growing system, and substrate of the plants for the purpose of providing mildew, fungus, pest, and other plant problem alleviation.

Figure 3:
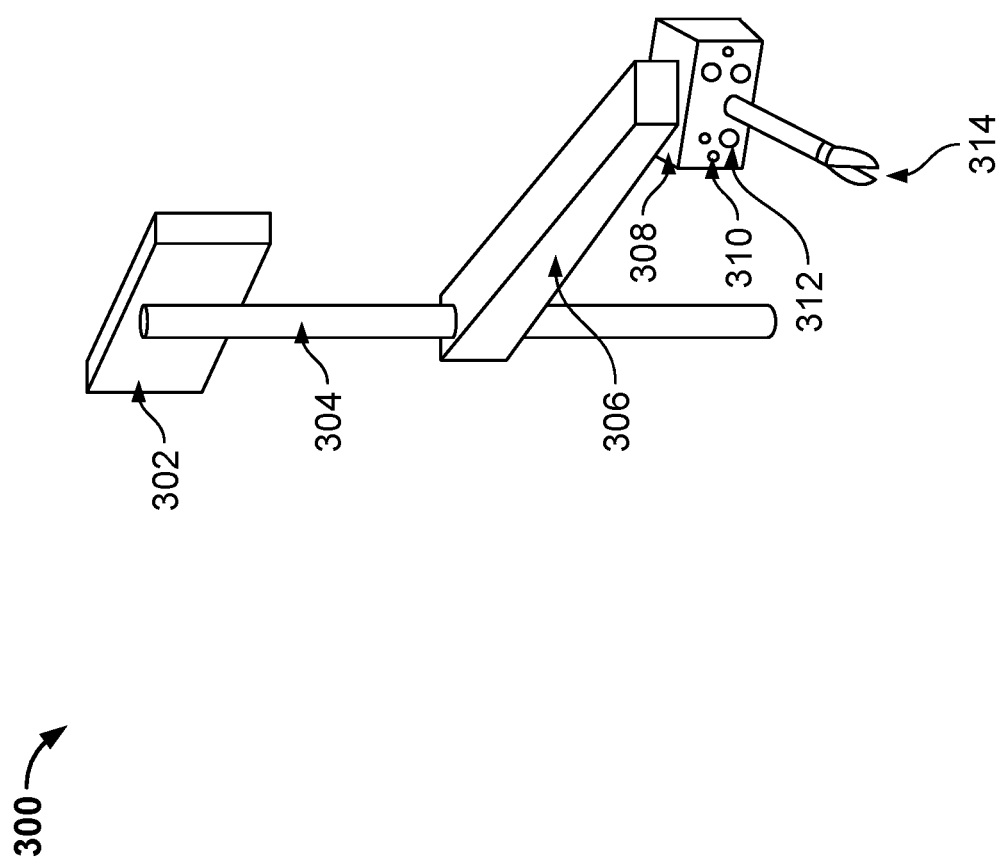
FIG. 3 is a diagram illustrating an arm module in accordance with some embodiments.

FIG. 3 is a diagram illustrating an arm module in accordance with some embodiments. Arm module 300 may include a linear transport, an elongated member, a robotic arm, and an end effector. A harvesting system, such as robotic harvesting system 100, may include one or more arm modules. A control system of the harvesting system may execute software that enables the harvesting system to operate a plurality of arm modules simultaneously. The software may include instructions that prevent collisions between the arms modules. The software may include instructions that enables coordination between the arm modules (e.g., a first arm module picks a first part of a grow environment while a second arm module picks a second part of a grow environment without accidental overlap).

Arm module 300 is configured to be attached and detached from the harvesting system. An arm module may be designed to harvest a specific type of object. For example, an arm module may be designed to harvest tomatoes, grapes, cucumbers, peppers, etc.

Arm module 300 may be constructed from sheet metal. Arm module 300 is generated using low cost manufacturing techniques. Arm module 300 may be constructed from sheet metal, machined, and printed parts to achieve the best combination of performance and low cost for the application and for the current scale of manufacturing. Other systems may use off-the-shelf components that include complex castings that are post-machined to construct an arm module. However, such off-the-shelf components are more expensive than sheet metal. As a result, the overall cost of a harvesting system that includes one or more arm modules that are constructed from sheet metal is lower than the overall cost of a harvesting system that include one or more arm modules constructed from off-the-shelf components.

In the example shown, arm module 300 includes a linear transport 302. The linear transport 302 is capable of moving along a linear rail, for example, linear rail 210. Linear transport 302 is coupled to elongated member 304. Elongated member 304 is coupled to a first segment 306 of a robotic arm via a first joint.

The first segment 306 may include a rotation assembly that enables the first segment 306 to rotate, via the first joint, around elongated member 304 in a clockwise or counterclockwise direction. The rotation assembly may include a belt and a servo motor.

The first segment 306 of the robotic arm may be coupled to a second segment 308 of the robotic arm via a second joint. The second segment 308 includes an electronics and mechanical component housing 310. The electronics and mechanical component housing 310 may include a rotation assembly comprised of a two stage belt transmission. The rotation assembly enables the second segment 308 to rotate, via the second joint, around the first segment in a clockwise or counter-clockwise direction.

The electronics and mechanical component housing 310 may include one or more cameras and/or one or more other sensors. The one or more cameras and/or the one or more other sensors may be pointed in a direction of end effector 314. As a result, the one or more cameras and/or the one or more other sensors may capture images of the growing environment, of plants, fruits, or the harvesting system to diagnose issues and capture information. The one or more cameras and/or the one or more other sensors may include RGB fisheye cameras that include wide-angle lenses, RGBD depth cameras, high-end high-resolution cameras that utilize multi-spectrum, and/or a combination thereof.

An output from the one or more cameras and/or the one or more other sensors may be provided to a secondary processing circuit board of the electronics and mechanical component housing 310. The secondary processing circuit board may include one or more processors that utilize one or more computer vision algorithms. The one or more processors may utilize the one or more computer vision algorithms to identify fruit. The one or more processors may utilize the one or more computer vision algorithms to uniquely mark each fruit or group of fruits within an identifier based on physical characteristics of the fruit itself, the surrounding fruits, and/or foliage. The computer vision algorithms may be configured to estimate the size, weight, exact location, ripeness, and/or any development issues associated with a fruit. Ripeness and commercial-grade associated with a fruit may be determined in place using the output from the one or more cameras and/or the one or more other sensors as inputs. A value associated with ripeness and commercial-grade may be based on one or more factors, such as color, shape, texture, uniformity, patterns, etc. In some embodiments, sugar content associated with a fruit may be determined based on IR light refraction.

The one or more processors may utilize the one or more computer vision algorithms to identify plant structure, barriers, obstructions, and/or obstacles. The one or more processors may utilize this information to determine a cost associated with navigating through these identified items to harvest an object. The one or more processors may utilize the one or more computer vision algorithms to identify specific plant health issues, such as disease or pest symptoms, abiotic stress symptoms, such as drought, temperature, or humidity problems, etc. The one or more processors may utilize the one or more computer vision algorithms to identify and distinguish between equipment and plant matter. The one or more processors may utilize the one or more computer vision algorithms to identify general environmental structures and paths.

The one or more processors may utilize the one or more control algorithms to perform collision avoidance, path planning, inverse kinematics, and high-level planning customized to the specific modular hardware implementation. In some embodiments, the one or more control algorithms include a fully customized stack including proprietary messaging, IK, path planning, low-level drivers, and higher-level planning.

In some embodiments, the one or more processors utilize the one or more control algorithms to direct the robotic arm to coordinates adjacent to each stem, in such a way that the robotic arm, when it advances, will do so toward the stem so as to avoid collisions with the front and side of the gripper or robotic arm with objects in the way.

In some embodiments, the one or more processors utilize the one or more control algorithms to compute the cost associated with collisions with certain types of plant matter to determine whether the robotic arm and end effector can navigate through the material to reach the location of the object to be harvested.

In some embodiments, the one or more processors utilize the one or more control algorithms to plan an order associated with picking a plurality of objects. In some embodiments, the plan is determined before the picking starts. In some embodiments, a plan associated with a next object may be determined while a current object is being picked. This may reduce the overall time to harvest a plurality of objects because the grow environment in which the plurality of objects are being harvested or assumptions associated with the plurality of objects may change as the objects are being harvested. For example, a cost associated with picking a second object may change as the robotic arm is picking a first object and more images of the second object are obtained.

The electronics and mechanical component housing 310 may be coupled to an end effector 314. End effector 314 may be comprised of a cutting mechanism and a gripping mechanism, which include corresponding sets of jaws. End effector 314 may be configured to open and close, in parallel, the cutting mechanism and the gripping mechanism. When the cutting mechanism and gripping mechanism are open, an appendage of the plant coupled to the object may be placed in an opening associated with the corresponding sets of jaws.

The one or more processors of the electronics and mechanical component housing 310 may receive one or more images from the one or more cameras and/or the one or more other sensors of the electronics and mechanical component housing 310. The one or more processors may identify one or more objects from the one or more images and assign a cost associated with the one or more identified objects. The one or more processors may select to harvest one of the one or more identified objects based on the associated cost and determine a relative distance between a current location of the end effector and a current location of the object. The one or more processors may send to a control system of the robotic harvesting system, such as control system 108, a command to move the robotic arm the relative distance. In response to receiving the command, the control system may cause the linear transport, the elongated member, and/or the robotic arm to move such that robotic arm is repositioned by the determined relative distance. Subsequently, an actuator associated with end effector 314 may apply a force that causes the cutting mechanism and the gripping mechanism to close. The applied force may cause the cutting mechanism to perform a cut that splits the plant appendage into a first portion and a second portion while the applied force causes the gripping mechanism to grasp the second portion of the plant appendage that is coupled to the object to be harvested. The robotic harvesting system may move end effector 314 to a storage location, such as bin 142, and open end effector 314, which causes the harvested object to be placed at the storage location.

Figure 4:
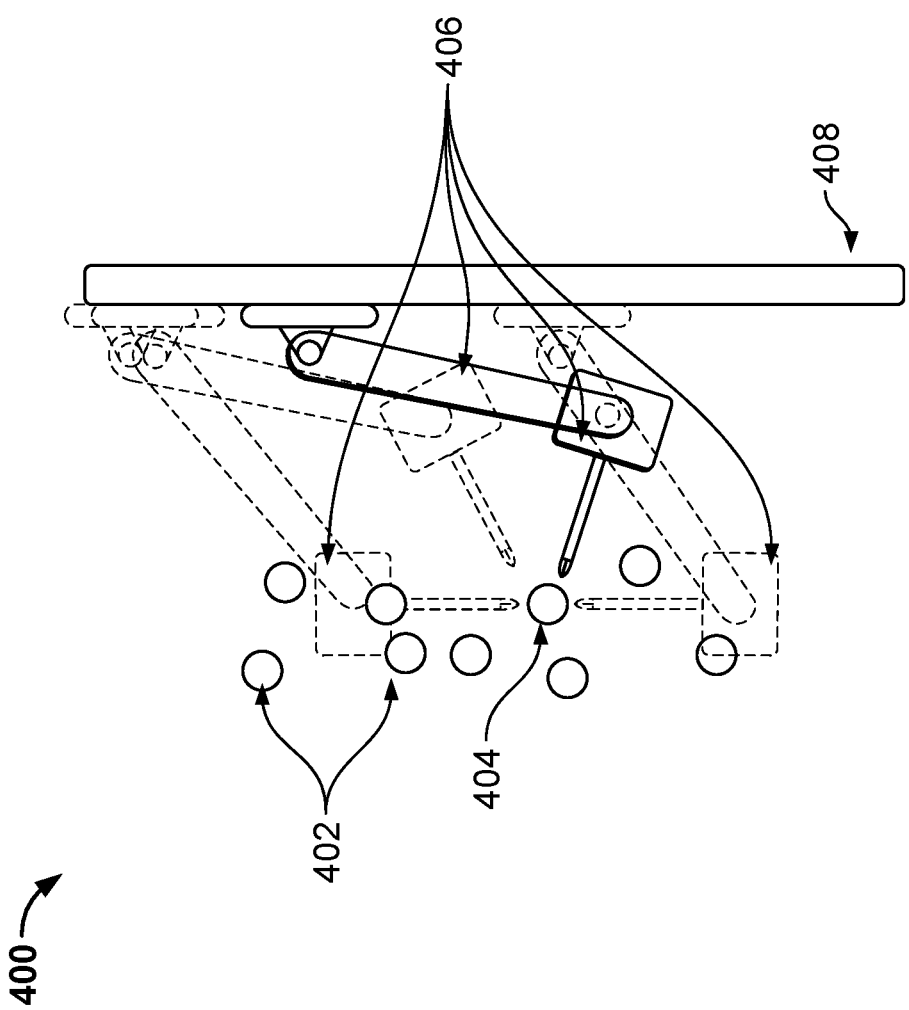
FIG. 4 is a diagram illustrating a plurality of approach angles in accordance with some embodiments.

FIG. 4 is a diagram illustrating a plurality of approach angles in accordance with some embodiments. In the example shown, a grow area at a particular location includes objects 402 and an object to be harvested 404. One or more processors associated with a robotic harvesting system may determine a corresponding cost associated with harvesting the objects 402 and the object to be harvested 404. In the example shown, the cost associated with harvesting object 404 is less than the corresponding costs associated with objects 402. Objects 402 may be harvested after object 404 is harvested. The corresponding costs associated with objects 402 may change after object 404 is harvested.

A robotic arm of the robotic harvesting system may approach object 404 from a plurality of angles 406. The configuration of the robotic arm enables the robotic harvesting system to approach and pick object 406 from any angle (e.g., 360°) or nearly any angle (e.g., 356°) depending upon the grow environment in which the object to be harvested resides. A control system may determine an approach angle for a particular object based on a cost associated with each approach angle and provide one or more commands that causes a robotic arm to approach and pick the object from the determined approach angle. The one or more commands may cause the linear transport to move along linear rail 408, a linear screw to rotate the robotic arm, a drive assembly to rotate a first segment of the robotic arm, a drive assembly to rotate a second segment of the robotic arm, and/or an end effector to open and close on a stem of object 406.

Figure 5:
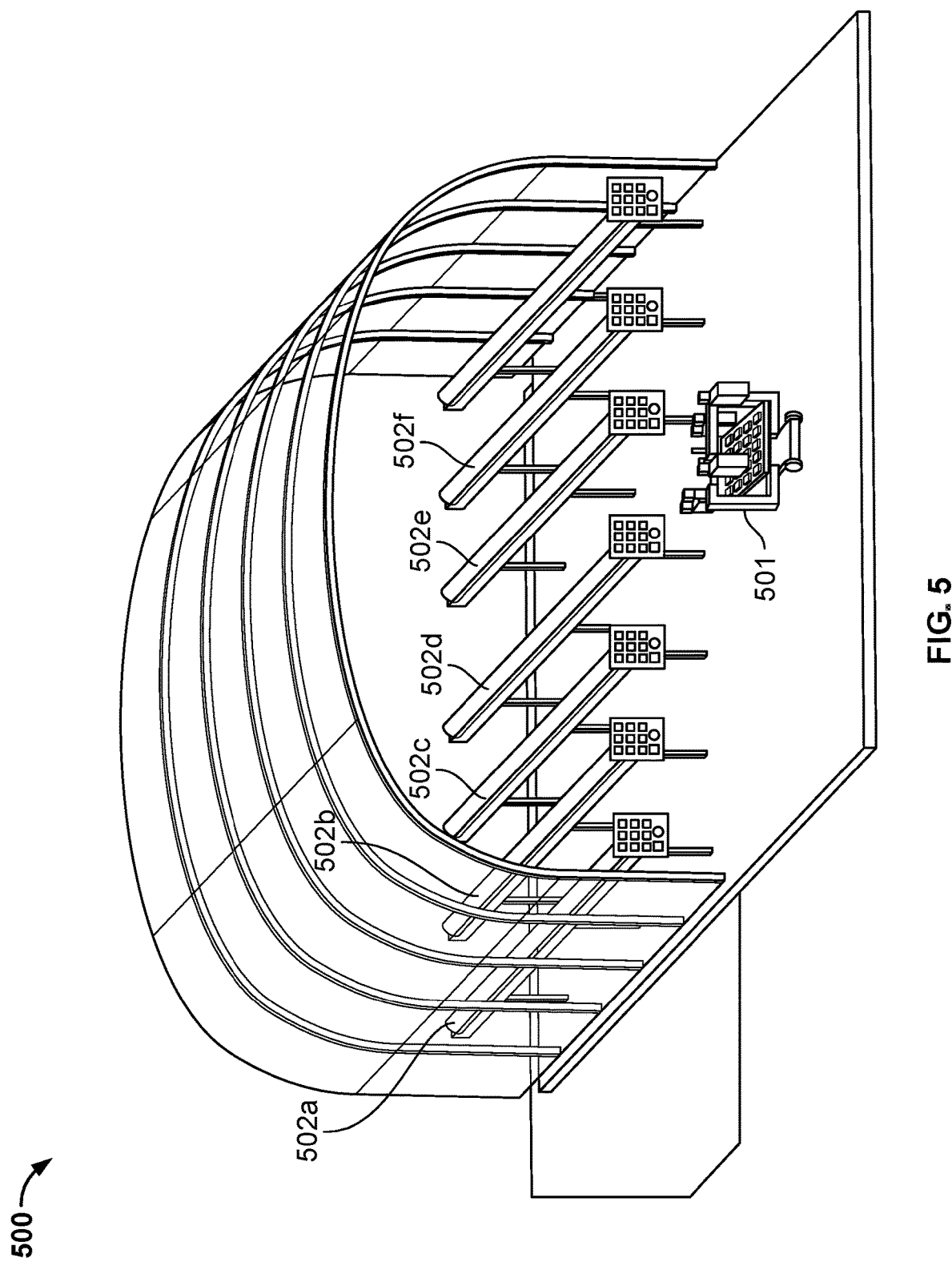
FIG. 5 is a diagram illustrating a grow environment in accordance with some embodiments.

FIG. 5 is a diagram illustrating a grow environment in accordance with some embodiments. In the example shown, grow environment 500 includes a plurality of rows 502a, 502b, 502c, 502d, 502e, 502f The plurality of rows may have a particular width. For example, the particular width may be 1 m. A base of harvesting system 501 may be designed to fit in between the particular width. The particular width may be different based on a country in which the grow environment is located. The particular width may be different may be different from farm to farm. The base of harvesting system 501 may be designed to fit in between rows, regardless of the country in which the grow environment is located.

Figure 6:
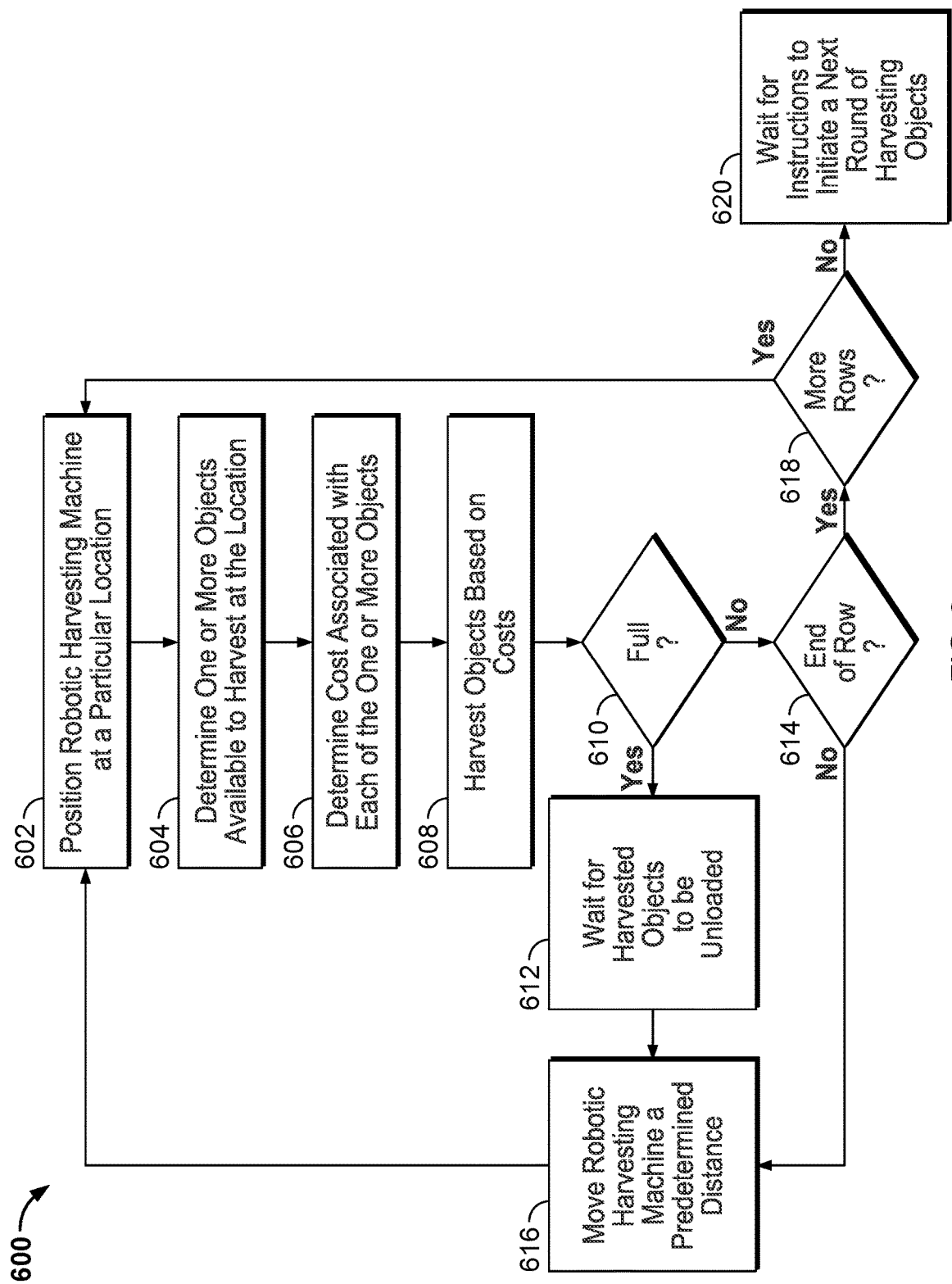
FIG. 6 is a flow chart illustrating a process for harvesting objects in accordance with some embodiments.

FIG. 6 is a flow chart illustrating a process for harvesting objects in accordance with some embodiments. In the example shown, process 600 may be implemented by a harvesting machine, such as robotic harvesting machine 100.

At 602, a robotic harvesting machine is positioned at a particular location. The particular location may include a first set of objects to be harvested.

At 604, one or more objects available at the location are determined. The robotic harvesting machine includes one or more cameras and/or one or more other sensors. The one or more cameras and/or the one or more other sensors may be located on a robotic arm. The robotic arm may be coupled to an end effector. The one or more cameras and/or the one or more other sensors may be pointed in a direction of end effector. The one or more cameras and/or the one or more other sensors may obtain one or more images, which may include image data that indicates one or more objects are available to be harvested at the particular location.

At 606, a cost associated with each of the one or more objects is determined. One or more processors of the robotic harvesting machine may utilize one or more computer vision algorithms to identify one or more objects included in the image data. The one or more processors may assign a cost to each of the one or more identified objects. The assigned cost may indicate a likelihood that object is able to be harvested. The assigned cost may be based on one or more factors, such as position of an object with respect to other objects to be harvested, approach angle needed to harvest object, the presence of any obstructions, ripeness of object, etc.

At 608, the objects are harvested based on the determined costs. The object having a lowest cost among the plurality of objects may be selected. A relative distance between a current location of an end effector and a current location of a selected object may be determined based on the image data. The one or more processors associated with a robotic arm may provide a control system of the robotic harvesting system a command to move the robotic arm the relative distance. In response to receiving the command, the control system of the robotic harvesting system may cause the linear transport, the elongated member, and/or the robotic arm to move such that robotic arm is repositioned by the determined relative distance.

Subsequently, an actuator associated with the end effector may apply a force that causes a cutting mechanism and a gripping mechanism of the end effector to close. The applied force may cause the cutting mechanism to perform a cut that splits the plant appendage associated with the object to be harvested into a first portion and a second portion while the applied force causes the gripping mechanism to grasp the second portion of the plant appendage that is coupled to the object to be harvested. The robotic harvesting system may move the end effector to a storage location of the robotic harvesting system and open the end effector, which causes the harvested object to be placed at the storage location.

After an object is harvested, the costs associated with the remaining objects to be harvested may be re-calculated and the process to harvest a subsequent object may be repeated.

At 610, it is determined whether the storage location of the robotic harvesting system is full with harvested objects. In the event it is determined that the storage location of the robotic harvesting system is full with harvested objects, process 600 proceeds to 612. In the event it is determined that the storage location of the robotic harvesting system is not full with harvested objects, process 600 proceeds to 614.

At 612, the robotic harvesting system waits for harvested objects to be unloaded. In some embodiments, an operator associated with the robotic harvesting system removes one or more trays storing the harvested objects from the robotic harvesting system and replaces the one or more removed trays with one or more new trays. In some embodiments, the robotic harvesting system stores one or more trays under the one or more trays storing the harvested objects and an operator associated with the robotic harvesting system removes one or more trays storing the harvested objects from the robotic harvesting system.

In some embodiments, a robotic tray system removes one or more trays storing the harvested objects from the robotic harvesting system and replaces the one or more removed trays with one or more new trays. In some embodiments, the robotic harvesting system stores one or more trays under the one or more trays storing the harvested objects and a robotic tray system removes one or more trays storing the harvested objects from the robotic harvesting system.

At 614, it is determined whether the harvesting machine is at an end of a row. In the event the harvesting machine is not at the end of a row, process 600 proceeds to 616 where the robotic harvesting machine is moved a predetermined distance.

In the event the harvesting machine is at the end of a row, process 600 proceeds to 618 where it is determined whether there are any more rows in the grow environment. In the event there are more rows in the grow environment, process 600 returns to 602. In the event there are no more rows in the grow environment, process 600 proceeds to 620 where the robotic harvesting system waits for instructions to initiate a next round of harvesting objects. For example, the robotic harvesting system may enter a sleep mode. Upon receiving instructions to initiate the next round of harvesting objects, process 600 may be repeated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a base configured to move in a direction of travel;
one or more storage containers within a boundary associated with the base;
a gantry system coupled to the base, wherein the gantry system includes a linear transport, wherein the linear transport is configured to move along the base in substantially a same direction or opposite direction as the direction of travel, wherein the linear transport is coupled to a rod, wherein the rod extends downwards from a top portion of the gantry system;
a robotic arm mounted to the rod at a first joint, wherein the rod is coupled to a movement assembly; and
a control system, wherein the control system is configured to:
send to the movement assembly one or more corresponding commands that cause the linear transport, the rod, and/or the robotic arm to move;
pick one or more objects and place the one or more objects in the one or more storage containers located within the boundary associated with the base;
determine that at least one of the one or more storage containers is full with harvested objects; and
replace the at least one of the one or more storage containers with one or more new storage containers that are stored under the one or more storage containers.

2. The system of claim 1, wherein the robotic arm includes a first segment that is coupled to the first joint and a second joint, wherein the first segment is configured to rotate toward and away from the base via the first joint.

3. The system of claim 2, wherein the robotic arm includes a second segment that is coupled to the first segment via the second joint, wherein the second segment is configured to rotate toward and away from the base via the second joint.

4. The system of claim 3, further includes an end effector is coupled to the second segment.

5. The system of claim 3, wherein the control system is configured to control a corresponding rotational angle associated with the first segment and a corresponding rotational angle associated with the second segment in order to approach an object from a desired angle.

6. The system of claim 3, further comprising one or more cameras and/or one or more sensors, wherein the one or more cameras and/or the one or more sensors are coupled to a distal end of the second segment.

7. The system of claim 6, wherein the control system is configured to move the robotic arm a relative distance from a current position of the robotic arm to a current position of an object.

8. The system of claim 7, wherein the relative distance is determined based on image data obtained from the one or more cameras and/or the one or more sensors.

9. The system of claim 1, wherein the gantry system includes a storage portion.

10. The system of claim 1, wherein the gantry system is configured to move up and down in a vertical direction associated with the base.

11. The system of claim 10, wherein the gantry system includes the movement assembly that enables a base frame of the gantry system to move up and down in the vertical direction associated with the base.

12. The system of claim 1, wherein the system further comprises a second robotic arm.

13. The system of claim 12, wherein the robotic arm and the second robotic arm are located on opposite sides of the base, wherein the second robotic arm is coupled to a second linear transport of the gantry system.

14. The system of claim 12, wherein the second robotic arm is capable of being rotated such that the robotic arm and the second robotic arm are located on a same side of the base.

15. The system of claim 12, wherein the robotic arm and the second robotic arm are configured to operate simultaneously.

16. The system of claim 1, wherein the base has a width of 0.5 m to 1.5 m.

17. The system of claim 1, wherein the base has a length of 1 m to 3 m.

18. The system of claim 1, wherein the base includes a U-channel portion.

19. The system of claim 1, wherein in response to a command, the base is configured to move a particular distance along the direction of travel.

20. The system of claim 19, wherein the particular distance is a length of the base or some fraction of the base.

* * * * *